US010504663B2

United States Patent
Kawai et al.

(10) Patent No.: US 10,504,663 B2
(45) Date of Patent: Dec. 10, 2019

(54) ELECTROCHEMICAL DEVICE

(71) Applicant: TAIYO YUDEN CO., LTD., Chuo-ku, Tokyo (JP)

(72) Inventors: Yuki Kawai, Takasaki (JP); Koji Kano, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/936,184

(22) Filed: Mar. 26, 2018

(65) Prior Publication Data
US 2018/0286600 A1 Oct. 4, 2018

(30) Foreign Application Priority Data

Mar. 28, 2017 (JP) .................................. 2017-062344

(51) Int. Cl.
*H01G 11/50* (2013.01)
*H01G 11/28* (2013.01)
(Continued)

(52) U.S. Cl.
CPC .............. *H01G 11/50* (2013.01); *H01G 11/06* (2013.01); *H01G 11/28* (2013.01); *H01G 11/52* (2013.01);
(Continued)

(58) Field of Classification Search
CPC ........ H01G 11/50; H01G 11/70; H01G 11/84; H01G 11/82; H01G 11/06; H01G 11/28
See application file for complete search history.

(56) References Cited

U.S. PATENT DOCUMENTS 8,815,451 B2* 8/2014 Wada ................ H01M 10/0422
429/233
9,496,584 B2* 11/2016 Taguchi ............. H01M 2/1673
(Continued)

FOREIGN PATENT DOCUMENTS

JP         11283676 A  * 10/1999
JP       2009187751 A    8/2009
(Continued)

OTHER PUBLICATIONS

A Notification of Reason for Refusal issued by Korean Intellectual Property Office, dated Apr. 12, 2019, for Korean counterpart application No. 10201800032196. (4 pages).

*Primary Examiner* — Nathan Milakovich
(74) *Attorney, Agent, or Firm* — Law Office of Katsuhiro Arai

(57) ABSTRACT

An electrochemical device has a positive electrode, a negative electrode, separators, and an electrolyte. The negative electrode has: a negative-electrode collector having a first principal face and a second principal face on the opposite side of the first principal face; a first negative-electrode active-material layer formed on the first principal face; and a second negative-electrode active-material layer which is formed intermittently on the second principal face and whose density of negative-electrode active material is lower than that of the first negative-electrode active-material layer. In the electrolyte, the positive electrode, negative electrode, and separators are immersed. The electrochemical device is such that the first and second negative-electrode active-material layers are pre-doped with lithium ions as a metallic lithium is electrically connected to the second principal face where the second negative-electrode active-material layer is not formed, and then immersed in the electrolyte.

8 Claims, 12 Drawing Sheets

(51) Int. Cl.
*H01G 11/58* (2013.01)
*H01G 11/06* (2013.01)
*H01G 11/82* (2013.01)
*H01G 11/84* (2013.01)
*H01G 11/86* (2013.01)
*H01G 11/52* (2013.01)
*H01G 11/70* (2013.01)

(52) U.S. Cl.
CPC ............. *H01G 11/58* (2013.01); *H01G 11/70* (2013.01); *H01G 11/82* (2013.01); *H01G 11/84* (2013.01); *H01G 11/86* (2013.01)

(56) References Cited

U.S. PATENT DOCUMENTS

| | | |
|---|---|---|
| 2011/0236748 A1 | 9/2011 | Nakashima et al. |
| 2013/0208404 A1 | 8/2013 | Yasuda et al. |
| 2014/0002959 A1 | 1/2014 | Ando et al. |
| 2017/0236656 A1* | 8/2017 | Kano ................... H01G 11/70 361/502 |
| 2018/0286597 A1* | 10/2018 | Kawai ................... H01G 11/06 |
| 2019/0066934 A1* | 2/2019 | Kano ................... H01G 11/70 |
| 2019/0067676 A1* | 2/2019 | Nagamitsu .......... H01M 4/0459 |

FOREIGN PATENT DOCUMENTS

| | | | |
|---|---|---|---|
| JP | 2010157540 A | | 7/2010 |
| JP | 2010238680 A | | 10/2010 |
| JP | 2012114161 A | * | 6/2012 |
| JP | 2014102897 A | | 6/2014 |
| JP | 2017147367 A | * | 8/2017 |
| JP | 2018148229 A | * | 9/2018 |
| JP | 2018148230 A | * | 9/2018 |
| KR | 101207723 B1 | | 12/2012 |
| KR | 1020170019054 A | | 2/2017 |
| WO | 2012063545 A1 | | 5/2012 |

* cited by examiner

FIG. 12

|  | Day 1 | Day 2 | Day 3 | Day 4 | Day 5 | Day 6 | Day 7 |
|---|---|---|---|---|---|---|---|
| Example | Some remained. | Reduced to 1/2 the area. | Invisible. | - | - | - | - |
| Comparative Example | Some remained. | Some remained. | Some remained. | Reduced to 1/2 the area. | Reduced to 1/4 the area. | Fragments remained. | Invisible. |

ELECTROCHEMICAL DEVICE

BACKGROUND

Field of the Invention

The present invention relates to an electrochemical device that utilizes lithium ion pre-doping.

Description of the Related Art

In recent years, electrochemical devices such as capacitors are utilized as systems for storing clean energy produced by solar generation, wind generation, etc., and also as main power supplies or auxiliary power supplies for automobiles, hybrid electric vehicles, and so on. In the above, electrical double-layer capacitors offer high output but their capacitance is low, while batteries are high in capacitance but their output is low. Accordingly, lithium ion capacitors whose negative electrode uses a material capable of occluding lithium ions, and which therefore boast higher capacitance than electrical double-layer capacitors and longer service life than batteries, are fast replacing batteries.

On the other hand, lithium ion capacitors require a step called "pre-doping" where lithium ions are doped into the negative electrode beforehand, as is the case with the invention described in Patent Literature 1, for example, and this can lead to lower productivity.

Accordingly, Patent Literature 2 describes a technology, for example, whereby a lithium ion supply source is placed in a positive electrode gap part or negative electrode gap part, for instance, so as to dope lithium ions more quickly into the negative electrode, thereby shortening the pre-doping time.

BACKGROUND ART LITERATURES

[Patent Literature 1] International Patent Laid-open No. 2012/063545

[Patent Literature 2] Japanese Patent Laid-open No. 2010-157540

SUMMARY

In the case of electrochemical devices that require lithium ion pre-doping, such as those described above, shortening the pre-doping time may not be possible if a metallic lithium is attached to the negative-electrode collector for pre-doping and the density of active material in the electrode layers formed on the front face and back face of the current collector is the same.

In light of the aforementioned situation, an object of the present invention is to provide an electrochemical device whose negative electrode can be pre-doped with lithium ions in a shorter period of time.

Any discussion of problems and solutions involved in the related art has been included in this disclosure solely for the purposes of providing a context for the present invention, and should not be taken as an admission that any or all of the discussion were known at the time the invention was made.

To achieve the aforementioned object, the electrochemical device pertaining to an embodiment of the present invention has a positive electrode, a negative electrode, separators, and an electrolyte.

The positive electrode has: a positive-electrode collector made of conductive material; and a positive-electrode active-material layer formed on the positive-electrode collector.

The negative electrode has: a negative-electrode collector having a first principal face and a second principal face on the opposite side of the first principal face; a first negative-electrode active-material layer formed on the first principal face; and a second negative-electrode active-material layer which is formed intermittently on the second principal face and whose density of negative-electrode active material is lower than that of the first negative-electrode active-material layer.

The separators insulate the positive electrode and the negative electrode.

In the electrolyte, the positive electrode, negative electrode, and separators are immersed.

The aforementioned electrochemical device is such that the first and second negative-electrode active-material layers are pre-doped with lithium ions as a metallic lithium is electrically connected to the second principal face where the second negative-electrode active-material layer is not formed, and then immersed in the electrolyte.

According to this constitution, the second negative-electrode active-material layer whose density of negative-electrode active material is lower than that of the first negative-electrode active-material layer, is formed intermittently on the negative electrode of the electrochemical device. This ensures intervals between the adjacent negative-electrode active materials in the second negative-electrode active-material layer in a favorable manner, which makes it easy to insert or dope lithium ions. As a result, the lithium ion doping efficiency improves during the course of manufacturing the electrochemical device, and the time needed to pre-dope lithium ions into the negative electrode can be shortened.

The density of negative-electrode active material of the second negative-electrode active-material layer may be lower than that of the first negative-electrode active-material layer by 10% or more.

The second negative-electrode active-material layer may be thicker than the first negative-electrode active-material layer.

The second negative-electrode active-material layer may be thicker than the first negative-electrode active-material layer by 5% or more.

The negative-electrode collector may be made of copper.

Copper is strong even in thin state, and also flexible, so it is an ideal material for the negative-electrode collector. Pressure-bonding copper with the metallic lithium prevents electrolyte from entering the pressure-bonded interface and causing the metallic lithium to melt from the interface side. As a result, electrical continuity is maintained between the negative-electrode collector and the metallic lithium, and the metallic lithium melts properly.

The negative-electrode collector may have multiple through holes.

By forming through holes in the negative-electrode collector, the efficiency of lithium ion pre-doping into the negative electrode can be improved further.

The positive electrode and the negative electrode may be stacked and wound together with the separators in between.

Under the present invention, the pre-doping time can be shortened even when the electrochemical device is a wound electrochemical device whose positive electrode and negative electrode are stacked and wound together with separators in between. In particular, a wound electrochemical device can be made smaller than a multilayer electrochemical device, because the wound type has less extra space inside the case.

According to the present invention, an electrochemical device whose negative electrode can be pre-doped with lithium ions in a shorter period of time can be provided, as described above.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 12 is a table showing the results of checking the state of remaining metallic lithium over the course of pre-doping of the electrochemical devices pertaining to an Example and a Comparative Example of the present invention.

DESCRIPTION OF THE SYMBOLS

100—Electrochemical device
110—Electric storage element
120—Container
130—Negative electrode
130a—First uncoated area
130b—Second uncoated area
131—Negative-electrode terminal
132—Negative-electrode collector
132a—First principal face
132b—Second principal face
132c—First area
132d—Second area
133—First negative-electrode active-material layer
134—Second negative-electrode active-material layer
140—Positive electrode
141—Positive-electrode terminal
142—Positive-electrode collector
142a—Third principal face
142b—Fourth principal face
143—Positive-electrode active-material layer
151—First separator
152—Second separator
M—Metallic lithium

DETAILED DESCRIPTION OF EMBODIMENTS

The electrochemical device proposed by the present invention is explained. The electrochemical device pertaining to this embodiment is a lithium ion capacitor or other electrochemical device that utilizes lithium ions to transport electric charges. It should be noted that, in the figures below, the X, Y, and Z directions represent three directions that are orthogonal to one another.

[Constitution of Electrochemical Device]

Figure 1:
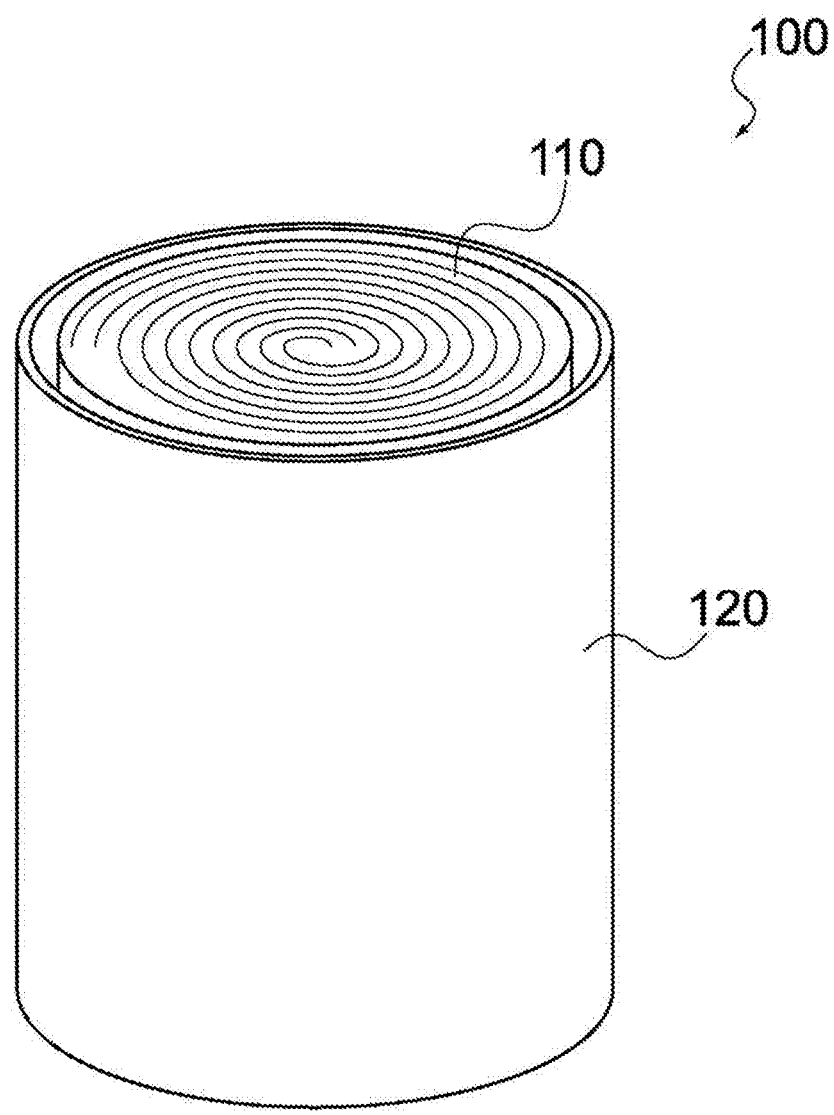
FIG. 1 is a perspective view showing the constitution of an electrochemical device pertaining to an embodiment of the present invention.

FIG. 1 is a perspective view showing the constitution of an electrochemical device 100 pertaining to this embodiment. As shown in this figure, the electrochemical device 100 is constituted by an electric storage element 110 housed in a container 120 (lids and terminals are not illustrated). An electrolyte is housed in the container 120 together with the electric storage element 110. It should be noted that the constitution of the electrochemical device 100 pertaining to this embodiment is not limited to the constitution shown in the figures below including FIG. 1.

Figure 2:
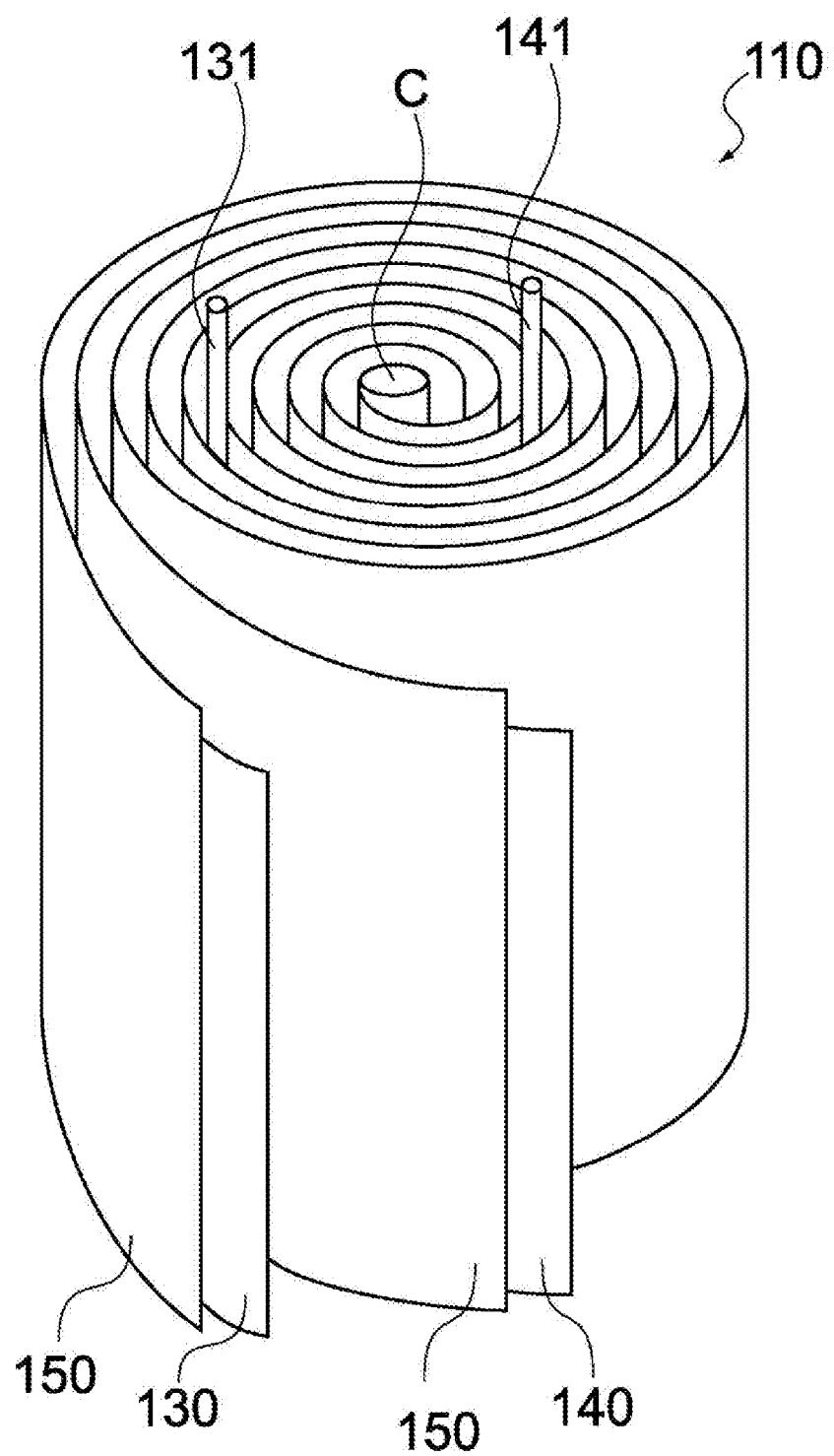
FIG. 2 is a perspective view of the electric storage element in an embodiment of the present invention.
Figure 3:
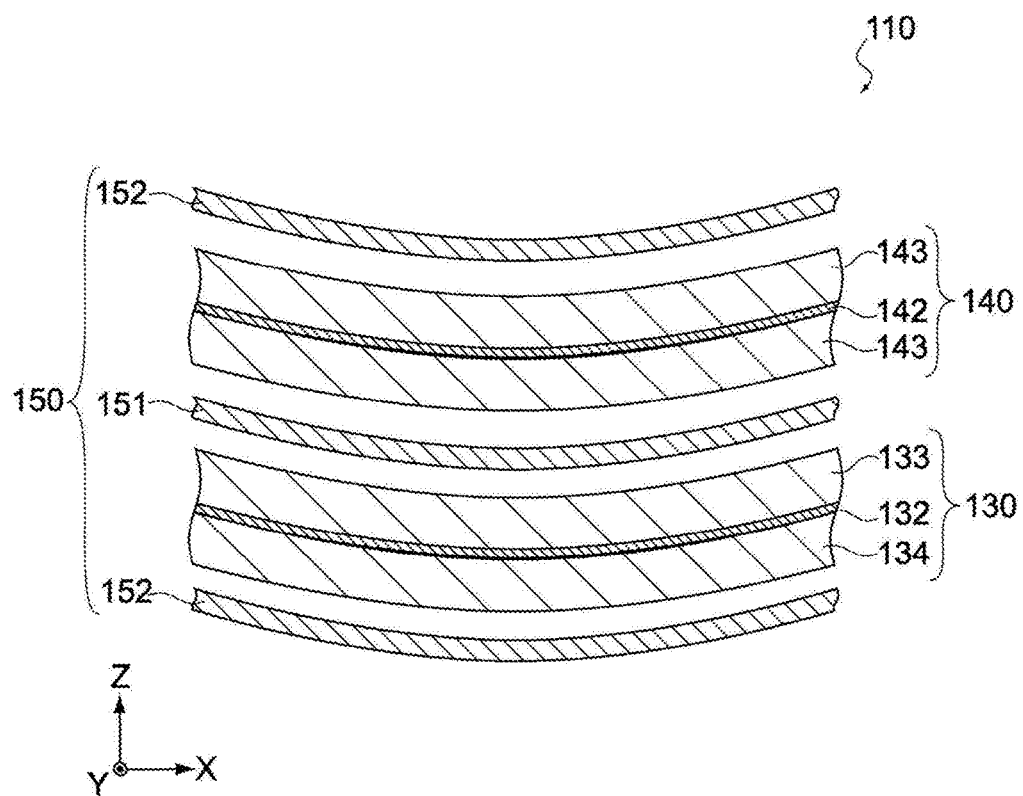
FIG. 3 is an enlarged cross-sectional view of the electric storage element in an embodiment of the present invention.

FIG. 2 is a perspective view of the electric storage element 110, while FIG. 3 is an enlarged cross-sectional view of the electric storage element 110. As shown in FIGS. 2 and 3, the electric storage element 110 has a negative electrode 130, a positive electrode 140, and separators 150, and is constituted by a laminate of the foregoing wound around a winding core C. It should be noted that the winding core C need not be provided.

The negative electrode 130, positive electrode 140 and separators 150 constituting the electric storage element 110 are stacked in the order of separator 150, negative electrode 130, separator 150, and positive electrode 140, toward the winding core C (from the outer side of winding), as shown in FIG. 2. In addition, the electric storage element 110 has a negative-electrode terminal 131 and a positive-electrode terminal 141, as shown in FIG. 2. The negative-electrode terminal 131 is connected to the negative electrode, while the positive-electrode terminal 141 is connected to the positive electrode, and both are led out to the exterior of the electric storage element 110, as shown in FIG. 2.

The negative electrode 130 has a negative-electrode collector 132, a first negative-electrode active-material layer 133, and a second negative-electrode active-material layer 134, as shown in FIG. 3. The negative-electrode collector 132 is made of conductive material, and may be a copper foil or other metal foil. The negative-electrode collector 132 may be a metal foil whose surface has been chemically or mechanically roughened, or a metal foil in which through holes have been formed, and typically in this embodiment, a metal foil in which through holes have been formed is used.

The first and second negative-electrode active-material layers 133, 134 are formed on the negative-electrode collector 132. The material of the first and second negative-electrode active-material layers 133, 134 may be a mixture of a negative-electrode active material with a binder resin, and it may further contain a conductive auxiliary agent. For the negative-electrode active material, any material capable of adsorbing the lithium ions in the electrolyte, such as non-graphitizable carbon (hard carbon), graphite, soft carbon, or other carbon material, Si, SiO, or other alloy material, or any composite material made from the foregoing, may be used.

For the binder resin, any synthetic resin that binds the negative-electrode active material, such as styrene butadiene rubber, polyethylene, polypropylene, aromatic polyamide, carboxy methyl cellulose, fluororubber, polyvinylidene fluoride, isoprene rubber, butadiene rubber, ethylene propylene rubber, etc., may be used.

The conductive auxiliary agent comprises grains made of conductive materials, and improves the conductivity between the negative-electrode active materials. The conductive auxiliary agent may be graphite, carbon black, or other carbon material, for example. Any of the foregoing may be used alone, or multiple types of these materials may be mixed. It should be noted that the conductive auxiliary agent may be a metal material, conductive polymer, or other material, so long as it has conductivity.

Figure 4A:
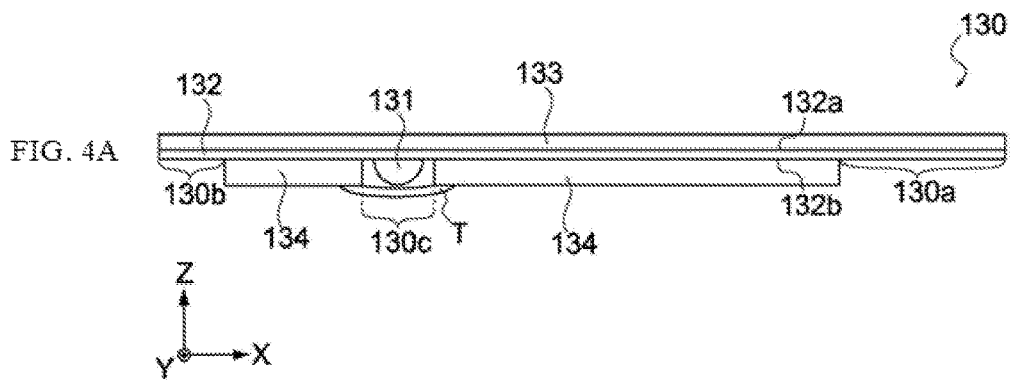
FIGS. 4A and 4B are schematic views showing the negative electrode in an embodiment of the present invention before winding.
Figure 4B:
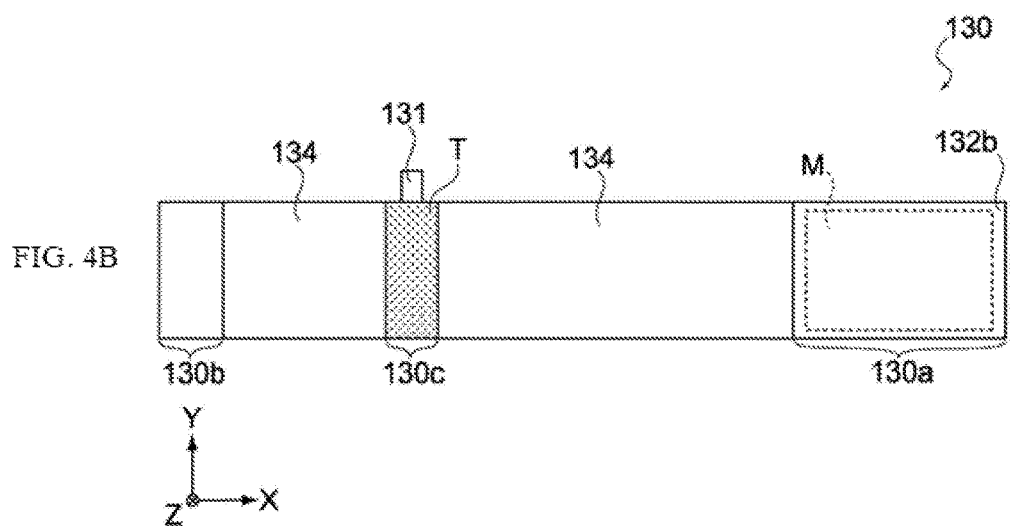

FIGS. 4A and 4B present schematic views showing the negative electrode 130 before winding, where FIG. 4A is a side view and FIG. 4B is a plan view. The negative electrode 130 pertaining to this embodiment has its first negative-electrode active-material layer 133 formed on the first principal face 132*a*, and its second negative-electrode active-material layer 134 formed on the second principal face 132*b*, of the negative-electrode collector 132, as shown in FIG. 4A.

Here, as shown in FIGS. 4A and 4B, the negative electrode 130 pertaining to this embodiment is such that the thickness of the second negative-electrode active-material layer 134 is greater than the thickness of the first negative-electrode active-material layer 133. To be specific, the thickness of the second negative-electrode active-material layer 134 is greater than the thickness of the first negative-electrode active-material layer 133 by 5% or more.

This way, the density of negative-electrode active material of the second negative-electrode active-material layer 134 becomes lower than the density of negative-electrode active material of the first negative-electrode active-material layer 133. To be specific, the density of negative-electrode active material of the second negative-electrode active-material layer 134 becomes lower than the density of negative-electrode active material of the first negative-electrode active-material layer 133 by 10% or more.

It should be noted that the negative electrode 130 pertaining to this embodiment is such that the contents of negative-electrode active material in the first and second negative-electrode active-material layers 133, 134 are the same (alternatively, the contents of negative-electrode active material in the first and second negative-electrode active-material layers can be different in other embodiments). It should also be noted that the term "density" refers to the weight of negative-electrode active material per unit volume of the negative-electrode active-material layer, and has the same meaning in the explanations below.

Also, the negative electrode 130 is such that first and second uncoated areas 130*a*, 130*b* and a separation area 130*c* where the second negative-electrode active-material layer 134 is not formed, are formed on the second principal face 132*b*, as shown in FIG. 4A. This results in a constitution where the second negative-electrode active-material layer 134 is formed intermittently on the second principal face 132*b*.

A metallic lithium M that becomes a lithium ion supply source is attached, and thereby electrically connected, to the negative-electrode collector 132 inside the first uncoated area 130*a*, as shown in FIG. 4B. The shape of the metallic lithium M is not limited in any way, but preferably it is shaped as a foil so as to reduce the thickness of the electric storage element 110. The metallic lithium M may be adjusted to a quantity sufficient to allow the first and second negative-electrode active-material layers 133, 134 to be doped during the below-mentioned lithium ion pre-doping.

The X-direction lengths of the first uncoated area 130*a* and second uncoated area 130*b* are not limited in any way, but preferably the X-direction length of the second uncoated area 130*b* is approx. $\frac{1}{2}\pi$ times the diameter of the winding core C. Also, the constitution may be such that the second uncoated area 130*b* is not provided.

The negative-electrode terminal 131 is connected to the negative-electrode collector 132 inside the separation area 130*c*, and led out to the exterior of the negative electrode 130, as shown in FIG. 4A. Also, the separation area 130*c* pertaining to this embodiment is sealed with a tape T, as shown in FIG. 4A, so as to prevent the negative-electrode collector 132 inside the separation area 130*c* from being exposed. The type of the tape T is not limited in any way, but preferably one having resistance to heat and to the solvent in the electrolyte, is adopted. The negative-electrode terminal 131 is a copper terminal, for example. It should be noted that, in this embodiment, the tape T may be omitted, if necessary.

The positive electrode 140 has a positive-electrode collector 142, and positive-electrode active-material layers 143, as shown in FIG. 3. The positive-electrode collector 142 is made of conductive material, and may be an aluminum foil or other metal foil. The positive-electrode collector 142 may be a metal foil whose surface has been chemically or mechanically roughened, or a metal foil in which through holes have been formed.

The positive-electrode active-material layers 143 are formed on the positive-electrode collector 142. The material of the positive-electrode active-material layer 143 may be a mixture of a positive-electrode active material with a binder resin, and it may further contain a conductive auxiliary agent. For the positive-electrode active material, any material capable of adsorbing the lithium ions and anions in the electrolyte, such as active carbon, polyacene carbide, etc., may be used.

For the binder resin, any synthetic resin that binds the positive-electrode active material, such as styrene butadiene rubber, polyethylene, polypropylene, aromatic polyamide, carboxy methyl cellulose, fluororubber, polyvinylidene fluoride, isoprene rubber, butadiene rubber, ethylene propylene rubber, etc., may be used.

The conductive auxiliary agent comprises grains made of conductive materials, and improves the conductivity between the positive-electrode active materials. The conductive auxiliary agent may be graphite, carbon black, or other carbon material, for example. Any of the foregoing may be used alone, or multiple types of these materials may be mixed. It should be noted that the conductive auxiliary agent may be a metal material, conductive polymer, or other material, so long as it has conductivity.

Figure 5A:
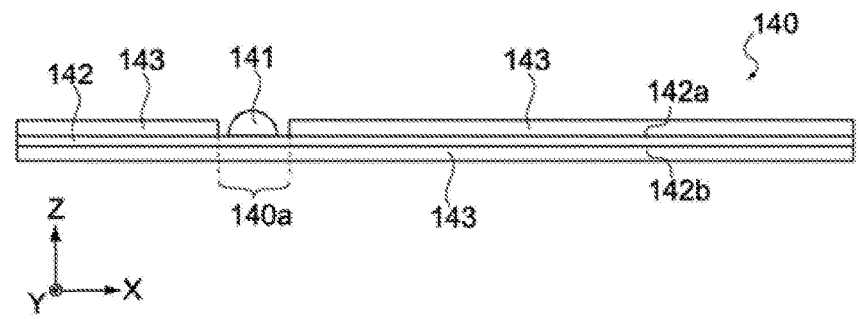
FIGS. 5A and 5B are schematic views showing the positive electrode in an embodiment of the present invention before winding.
Figure 5B:
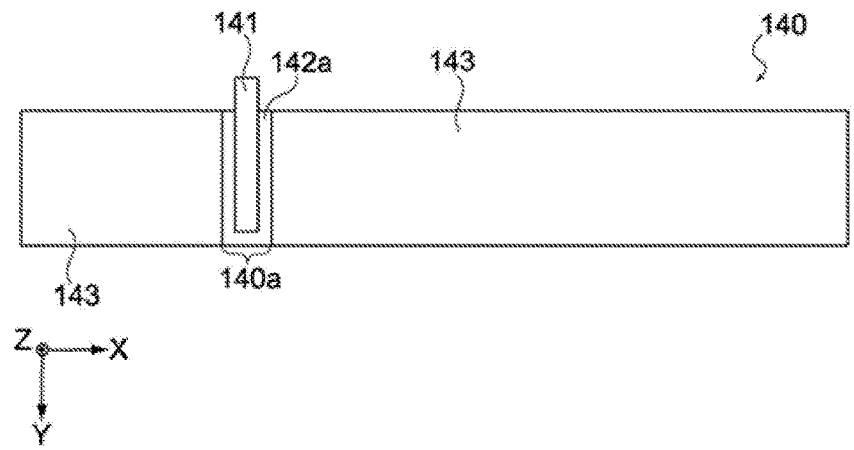

FIGS. 5A and 5B present schematic views showing the positive electrode 140 before winding, where FIG. 5A is a side view and FIG. 5B is a plan view. The positive electrode 140 pertaining to this embodiment has its positive-electrode active-material layer 143 formed on both the third principal face 142a and fourth principal face 142b of the positive-electrode collector 142, and a separation area 140a where the positive-electrode active-material layer 143 is not formed, is provided on the third principal face 142a, as shown in FIG. 5A.

Here, as shown in FIGS. 5A and 5B, the positive-electrode terminal 141 is connected to the positive-electrode collector 142 inside the separation area 140a, and led out to the exterior of the positive electrode 140. It should be noted that, on the positive electrode 140, the separation area 140a where the positive-electrode terminal 141 is placed, may be formed on the fourth principal face 142b. Also, the separation area 140a may be sealed with a tape, etc. The positive-electrode terminal 141 is an aluminum terminal, for example.

The separators 150 insulate the negative electrode 130 and the positive electrode 140, and include a first separator 151 and a second separator 152, as shown in FIG. 3.

The first separator 151 and second separator 152 separate the negative electrode 130 and the positive electrode 140, but let the below-mentioned ions contained in the electrolyte permeate through them. To be specific, the first separator 151 and second separator 152 may each be a woven fabric, nonwoven fabric, synthetic resin microporous membrane, etc., whose primary ingredient is olefin resin, for example. Also, the first separator 151 and second separator 152 may form a single continuous separator.

Figure 6:
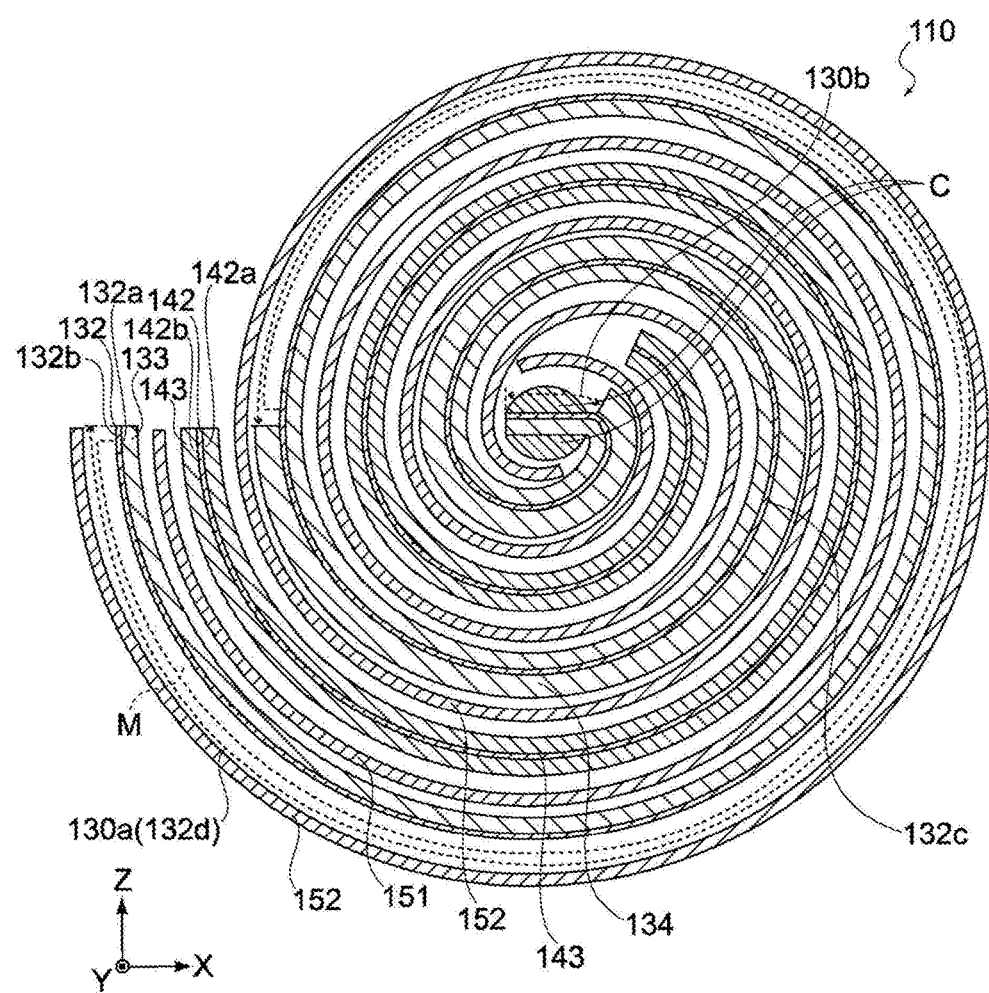
FIG. 6 is a cross-sectional view of the electric storage element in an embodiment of the present invention.

FIG. 6 is a cross-sectional view of the electric storage element 110 (negative-electrode terminal 131 and positive-electrode terminal 141 are not illustrated). The electric storage element 110 pertaining to this embodiment is such that, as shown in FIG. 6, the negative electrode 130 and the positive electrode 140 are stacked and wound together with the first separator 151 and second separator 152 in between. To be specific, it is constituted in such a way that the first principal face 132a of the negative-electrode collector 132 and the third principal face 142a of the positive-electrode collector 142 come to the inner side of winding, while the second principal face 132b of the negative-electrode collector 132 and the fourth principal face 142b of the positive-electrode collector 142 come to the outer side of winding.

Here, the electric storage element 110 is constituted so that the electrode on the outermost side of winding (outermost periphery) becomes the negative electrode 130 and, as shown in FIG. 6, the first uncoated area 130a is provided on the second principal face 132b of the negative-electrode collector 132 on the outermost side of winding, while the second uncoated area 130b is provided at the end of the negative-electrode collector 132 on the innermost side of winding.

Also, the first principal face 132a of the negative-electrode collector 132 faces the positive electrode 140 (positive-electrode active-material layer 143) via the first separator 151, as shown in FIG. 6. The second principal face 132b, as shown in the same figure, has a first area 132c that faces the positive electrode 140 (positive-electrode active-material layer 143) via the second separator 152, and a second area 132d that constitutes the outermost side of winding and does not face the positive electrode 140 (positive-electrode active-material layer 143) via the second separator 152. The electric storage element 110 in this embodiment has a metallic lithium M attached to, and thus electrically connected to, this second area 132d.

The container 120 houses the electric storage element 110. The top face and bottom face of the container 120 may be closed by lids that are not illustrated. The material of the container 120 is not limited in any way, and it may be made of a metal whose primary component is aluminum, titanium, nickel, or iron, or of stainless steel, etc., for example.

The electrochemical device 100 is constituted as described above. The electrolyte housed in the container 120 together with the electric storage element 110 is not limited in any way, but a solution whose solute is $LiPF_6$, etc., may be used, for example.

[Manufacturing Method of Electrochemical Device]

A method for manufacturing the electrochemical device 100 pertaining to this embodiment is explained. It should be noted that the manufacturing method presented below is only an example, and the electrochemical device 100 may be manufactured using a manufacturing method different from the one presented below. FIGS. 7A to 11C are schematic views showing a process for manufacturing the electrochemical device 100.

Figure 7A:
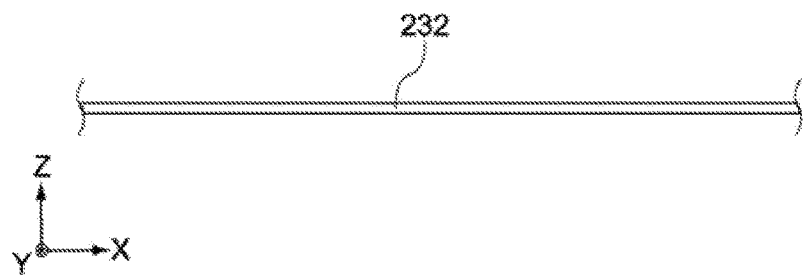
FIGS. 7A to 7C are schematic views showing a process for manufacturing the electrochemical device pertaining to an embodiment of the present invention.

FIG. 7A shows a metal foil 232 in which through holes have been formed, which will become a negative-electrode collector 132. The metal foil 232 is a copper foil, for example. The thickness of the metal foil 232 is not limited in any way, but it may be several tens of micrometers to several hundreds of micrometers, for example.

Figure 7B:
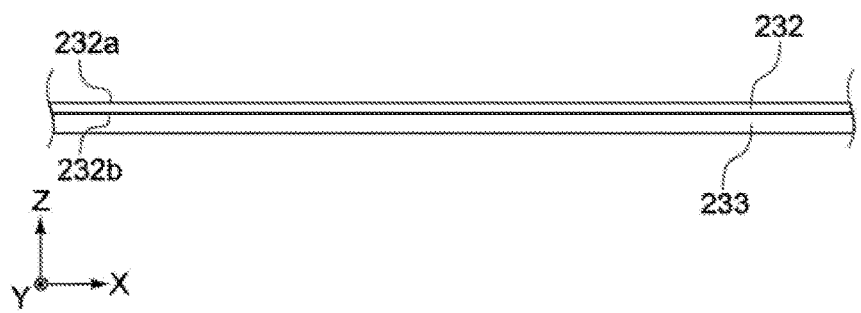

Next, a negative electrode paste containing negative-electrode active material, conductive auxiliary agent, binder, etc., is applied on a back face 232b of the metal foil 232, and then dried or cured. This way, a first negative-electrode active-material layer 233 is formed on the back face 232b of the metal foil 232, as shown in FIG. 7B.

Figure 7C:
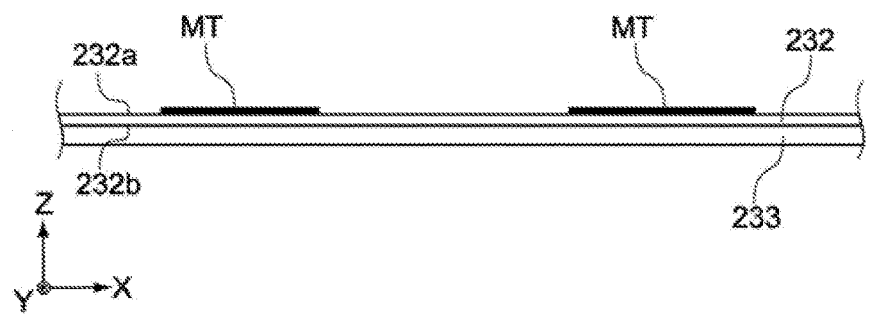
Figure 8A:
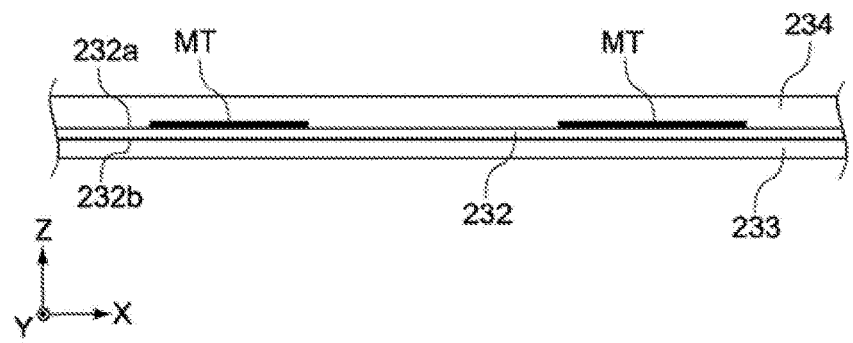
FIGS. 8A to 8C are schematic views showing a process for manufacturing the electrochemical device pertaining to an embodiment of the present invention.

Next, as shown in FIG. 7C, masking tapes MT are attached, at equal intervals along the X direction, on a front face 232a of the metal foil 232. Then, on the front face 232a of the metal foil 232 to which the masking tapes MT have been attached, a negative electrode paste which contains conductive auxiliary agent, binder, etc., and also the same amount of negative-electrode active material as the first negative-electrode active-material layer 233, is applied more thickly than the first negative-electrode active-material layer 233, and then dried or cured. Preferably the drying or curing conditions are such that the paste is dried or cured faster than when the first negative-electrode active-material layer 233 was formed. This way, a second negative-electrode active-material layer 234 whose density of negative-electrode active material is lower than that of the first negative-electrode active-material layer 233 is formed on the front face 232a, as shown in FIG. 8A.

Figure 8B:
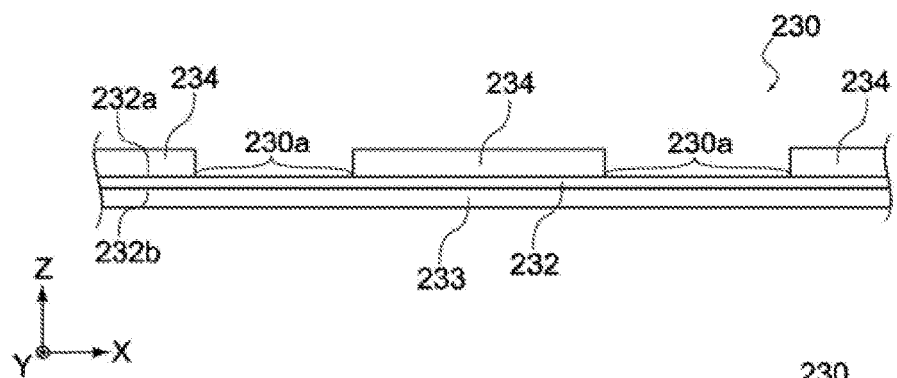

Next, the second negative-electrode active-material layer 234 that has been formed on the front face 232a of the metal foil 232 is partially removed by peeling the masking tapes MT, to obtain an electrode layer 230 on which separation areas 230a where the metal foil 232 is exposed have been formed, as shown in FIG. 8B. This way, as shown in the same figure, the second negative-electrode active-material layer 234 is formed intermittently on the front face 232a of the metal foil 232. It should be noted that the method for forming the second negative-electrode active-material layer 234 is not limited in any way, and it may be formed by a method other than masking.

Figure 8C:
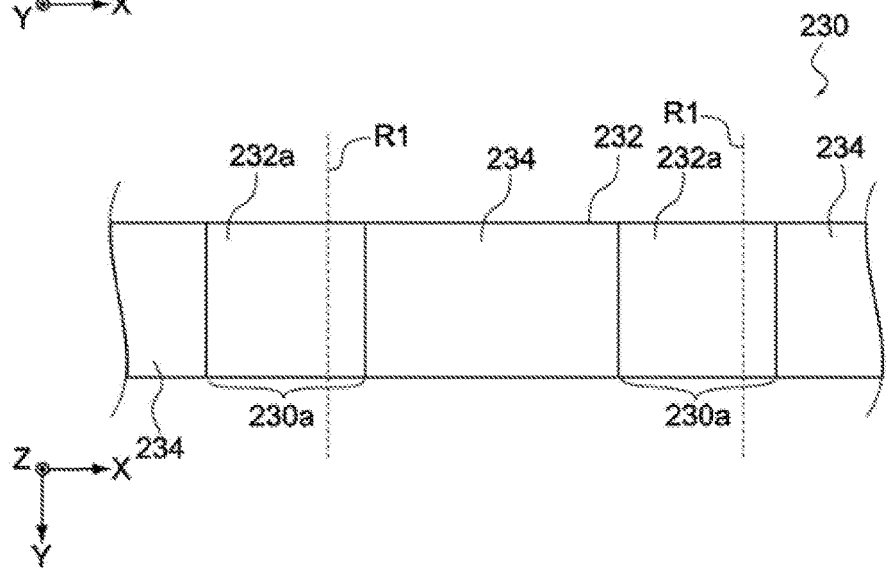
Figure 9A:
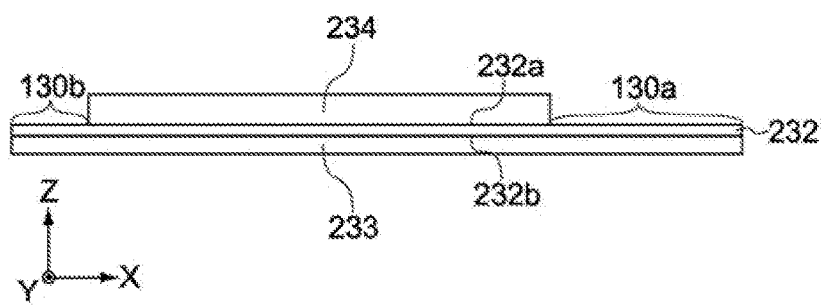
FIGS. 9A and 9B are schematic views showing a process for manufacturing the electrochemical device pertaining to an embodiment of the present invention.

Next, as shown in FIG. 8C, the metal foil 232 and first negative-electrode active-material layer 233 are cut together between the second negative-electrode active-material layers 234 formed at specified intervals on the front face 232a of the metal foil 232 (along the dotted lines R1 shown in FIG. 8C). This way, first and second uncoated areas 130a, 130b where the second negative-electrode active-material layer 234 is not formed, are formed on the front face 232a of the metal foil 232, as shown in FIG. 9A.

Figure 9B:
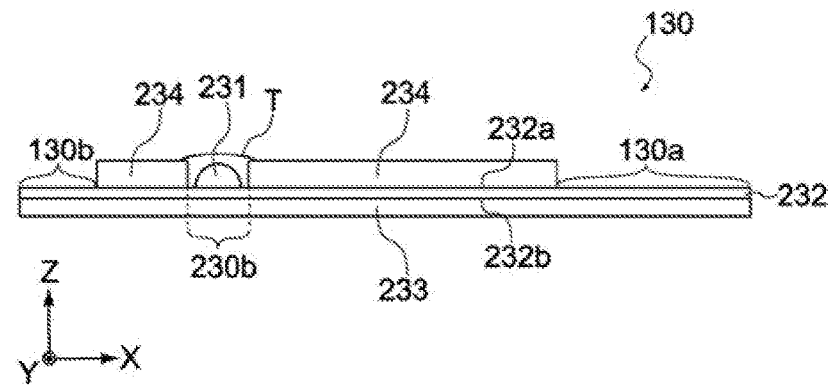

Next, the second negative-electrode active-material layer 234 that has been formed on the front face 232a of the metal foil 232 is partially peeled, to form a separation area 230b where the metal foil 232 is exposed, as shown in FIG. 9B. Then, as shown in the same figure, a negative-electrode terminal 231 is connected to the metal foil 232 inside the separation area 230b, after which the separation area 230b is sealed with a tape T, to obtain a negative electrode 130.

Figure 10A:
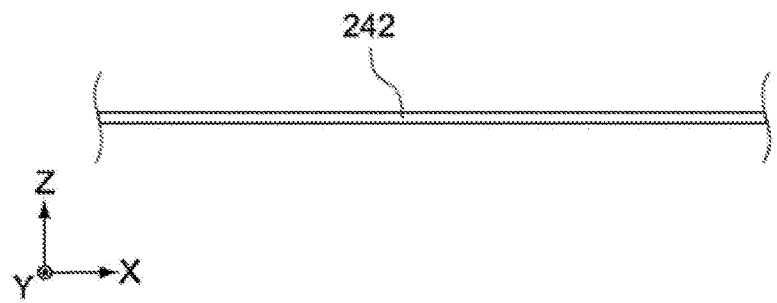
FIGS. 10A to 10C are schematic views showing a process for manufacturing the electrochemical device pertaining to an embodiment of the present invention.

Next, as shown in FIG. 10A, a metal foil 242 in which through holes have been formed, which will become a positive-electrode collector 142, is prepared. The metal foil 242 is an aluminum foil, for example. The thickness of the metal foil 242 is not limited in any way, but it may be several tens of micrometers to several hundreds of micrometers, for example.

Figure 10B:
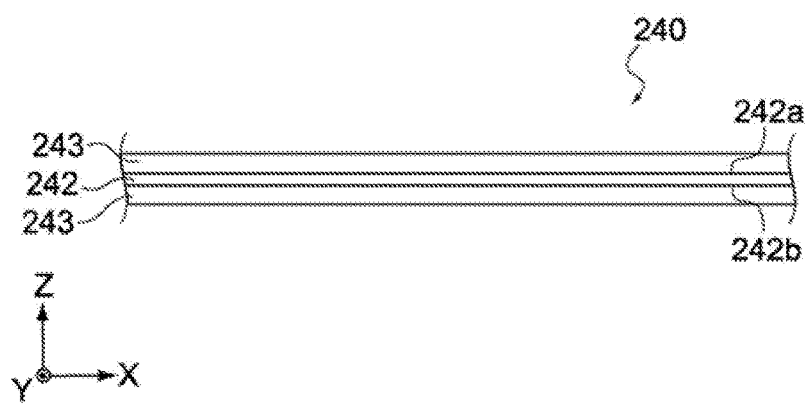

Next, a positive electrode paste containing positive-electrode active material, conductive auxiliary agent, binder, etc., is applied on a front face 242a and back face 242b of the metal foil 242, and then dried or cured. This way, an electrode layer 240 constituted by the metal foil 242 with positive-electrode active-material layers 243 formed on it, is obtained, as shown in FIG. 10B.

Figure 10C:
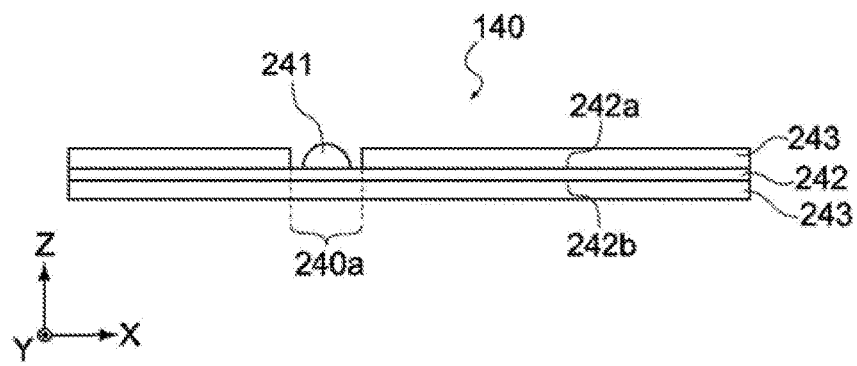

Next, the electrode layer 240 is cut, and the positive-electrode active-material layer 243 formed on either the front face 242a or back face 242b of the metal foil 242 is partially peeled, to form a separation area 240a where the metal foil 242 is exposed, as shown in FIG. 10 (c). Then, as shown in the same figure, a positive-electrode terminal 241 is connected to the metal foil 242 inside the separation area 240a, to obtain a positive electrode 140.

Figure 11A:
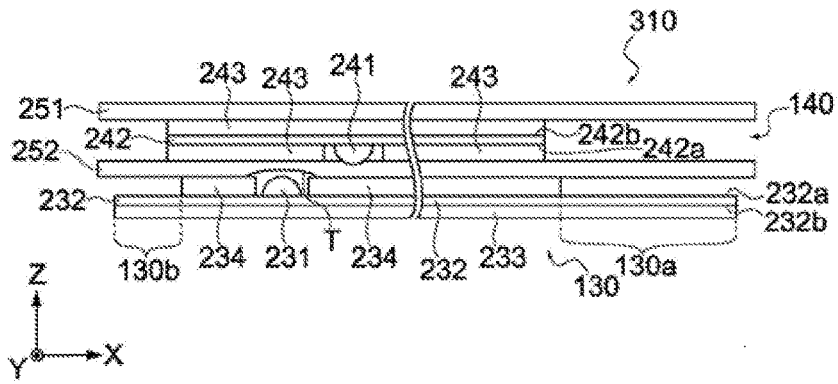
FIGS. 11A to 11C are schematic views showing a process for manufacturing the electrochemical device pertaining to an embodiment of the present invention.
Figure 11B:
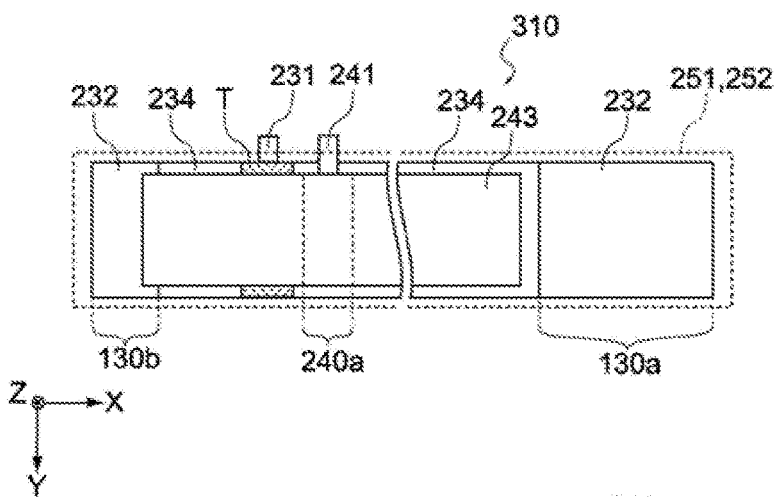

Next, the negative electrode 130, positive electrode 140, first separator 251 and second separator 252 are stacked together, to obtain a laminate 310, as shown in FIGS. 11A and 11B. Here, the laminate 310 is placed in such a way that the negative electrode 130 comes to the inner side of winding, the positive electrode 140 comes to the outer side of winding, and the second uncoated area 130b of the negative electrode 130 comes to the winding core C side, as shown in FIG. 11A. It should be noted that FIG. 11B is a plan view of the laminate 310 shown in FIG. 11A.

Figure 11C:
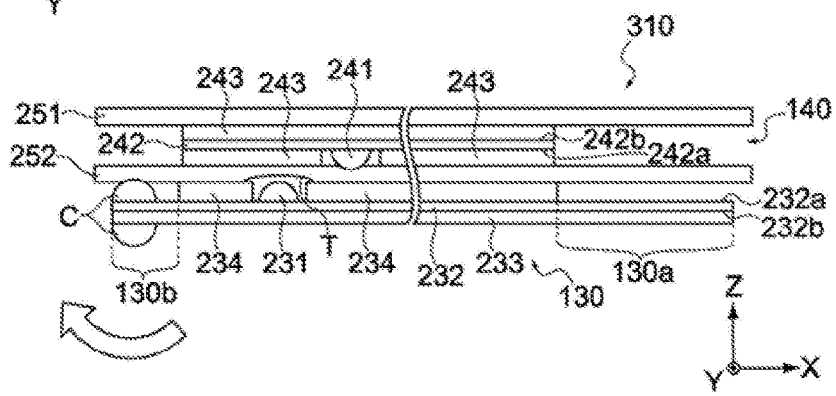

Next, as shown in FIG. 11C, the positive electrode 140 is shifted in the X direction by a specified amount so that the positive electrode 140 will not face the second uncoated area 130b via the second separator 252. Then, as shown in the same figure, the metal foil 232 and the first negative-electrode active-material layer 233 inside the second uncoated area 130b, are clamped into the winding core C, and then the laminate 310 is wound around the winding core C in a manner going around the Y-axis so that the first uncoated area 130a comes to the outermost side of winding.

This way, a wound body (refer to FIGS. 2 and 6) whose inner side of winding is constituted by the back face 232b of the metal foil 232 and the front face 242a of the metal foil 242, and whose outer side of winding is constituted by the front face 232a of the metal foil 232 and the back face 242b of the metal foil 242, is obtained.

Next, a metallic lithium M is electrically connected to the first uncoated area 130a placed on the outermost side of winding of the wound body as obtained by the aforementioned steps (refer to FIG. 6), to obtain an electric storage element 110. Next, the electric storage element 110 to which the metallic lithium M has been electrically connected, is housed in a container 120 filled with an electrolyte, and then the container 120 is sealed. This way, lithium ions are pre-doped into the negative electrode 140 from the metallic lithium M.

Now, the second negative-electrode active-material layer 234 whose density of negative-electrode active material is lower than that of the first negative-electrode active-material layer 233 is formed on the negative electrode 140 of the electric storage element 110. In other words, the negative electrode 140 pertaining to this embodiment has the second negative-electrode active-material layer 234 in which the negative electrode material is filled less densely.

This ensures intervals between the adjacent negative-electrode active materials in the second negative-electrode active-material layer 234 in a favorable manner, which makes it easy to insert lithium ions. As a result, the lithium ion doping efficiency improves during the course of manufacturing the electrochemical device 100, and the time needed to pre-dope lithium ions into the negative electrode can be shortened.

Also formed on the negative electrode 140 pertaining to this embodiment, in the entire area of the back face 232b, is the first negative-electrode active-material layer 233 in which the negative-electrode active material is filled in a normal way. This way, a sufficient capacitance of the electrochemical device 100 is ensured by the first negative-electrode active-material layer 233, even when the second negative-electrode active-material layer 234 whose density of negative electrode material is lower, is formed on the front face 232a.

In other words, the electrochemical device 100 pertaining to this embodiment represents a constitution that permits a shorter pre-doping time while ensuring a sufficient capacitance at the same time, owing to the formation, on the front face 232a, of the second negative-electrode active-material layer 234 whose density of negative-electrode active material is lower, and the formation, in the entire area of the back face 232b, of the first negative-electrode active-material layer 233 in which the negative-electrode active material is filled in a normal way.

The electrochemical device 100 can be manufactured as described above. It should be noted that the negative-electrode terminal 231 corresponds to the negative-electrode terminal 131, while the positive-electrode terminal 241 corresponds to the positive-electrode terminal 141. It should also be noted that the separation area 230b corresponds to the separation area 130c, while the separation area 240a corresponds to the separation area 140a.

Furthermore, the metal foil 232 corresponds to the negative-electrode collector 132, the metal foil 242 corresponds to the positive-electrode collector 142, the first negative-electrode active-material layer 233 corresponds to the first negative-electrode active-material layer 133, and the second negative-electrode active-material layer 234 corresponds to the second negative-electrode active-material layer 134. Also, the positive-electrode active-material layer 243 corresponds to the positive-electrode active-material layer 143.

In addition, the front faces 232a and 242a correspond to the second principal face 132b and third principal face 142a, respectively, while the back faces 232b and 242b correspond to the first principal face 132a and fourth principal face 142b, respectively. Also, the first separator 251 corresponds to the first separator 151, while the second separator 252 corresponds to the second separator 152.

EXAMPLE

An example of the present invention is explained below.
[Creation of Lithium Ion Capacitor]
Lithium ion capacitor samples pertaining to an Example and a Comparative Example were prepared according to the aforementioned manufacturing method. The samples pertaining to the Example and Comparative Example both had a capacitance of 10 F.

Example

For the sample pertaining to the Example, a pierced copper foil with a thickness of 10 μm was adopted for the negative-electrode collector, and the second negative-electrode active-material layer was formed approx. 10% thicker than the first negative-electrode active-material layer. It should be noted that, in the Example, a slurry primarily containing hard carbon was used as the basis of the negative-electrode active-material layer.

Comparative Example

The sample pertaining to the Comparative Example shares the same constitutions and manufacturing conditions with the sample pertaining to the Example, except that the first negative-electrode active-material layer and the second negative-electrode active-material layer both have the same density of negative-electrode active material.

[Evaluation of Pre-doping Time]
A metallic lithium was pre-doped into the negative electrodes pertaining to the Example and Comparative Example according to the aforementioned manufacturing method. Here, the state of remaining metallic lithium was visually checked with the passing of time. FIG. 12 is a table summarizing the results.

As shown in FIG. 12, the metallic lithium was completely invisible in three days in the sample pertaining to the Example (it should be noted that even if the metallic lithium was completely invisible, a residue of the metallic lithium can be detectable to confirm that the metallic lithium was present during the pre-doping process). In the sample pertaining to the Comparative Example, on the other hand, it took seven days for the metallic lithium to be completely invisible.

The foregoing is an empirical confirmation that the electrochemical device pertaining to this embodiment, which is produced according to the aforementioned manufacturing method, can have its negative electrode pre-doped with lithium ions in a shorter period of time during its course of manufacturing.

The above explained an embodiment of the present invention; however, it goes without saying that the present invention is not limited to the aforementioned embodiment and that various modifications may be added.

For example, a wound lithium ion capacitor was explained as an example of the electrochemical device 100 in the aforementioned embodiment; however, the present invention can also be applied to a so-called multilayer lithium ion capacitor having an electrode unit which is constituted by multiple sheet-shaped positive electrodes and negative electrodes stacked alternately together with separators in between.

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2017-062344, filed Mar. 28, 2017, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:
1. An electrochemical device, comprising:
a positive electrode having: a positive-electrode collector made of conductive material; and a positive-electrode active-material layer formed on the positive-electrode collector;
a negative electrode having: a negative-electrode collector made of conductive material and having a first principal face and a second principal face on an opposite side of the first principal face; a first negative-electrode active-material layer formed on the first principal face; and a second negative-electrode active-material layer which is formed intermittently on the second principal face and has a density of negative-electrode active material which is lower than that of the first negative-electrode active-material layer;
separators that insulate the positive electrode and the negative electrode; and
an electrolyte in which the positive electrode, negative electrode, and separators are immersed;
wherein an uncoated area of the second principal face where the second negative-electrode active-material layer is not formed has a first uncoated area where a metallic lithium is attached to, and thus electrically connected to, the uncoated area and immersed in the electrolyte, to pre-dope the first and second negative-electrode active-material layers with lithium ions, wherein the first and second negative-electrode active-material layers are pre-doped with lithium ions derived from the metallic lithium.
2. The electrochemical device according to claim 1, wherein the density of the negative-electrode active material of the second negative-electrode active-material layer is lower than that of the first negative-electrode active-material layer by 10% or more.

3. The electrochemical device according to claim 1, wherein the second negative-electrode active-material layer is thicker than the first negative-electrode active-material layer.

4. The electrochemical device according to claim 3, wherein the second negative-electrode active-material layer is thicker than the first negative-electrode active-material layer by 5% or more.

5. The electrochemical device according to claim 1, wherein the negative-electrode collector is made of copper.

6. The electrochemical device according to claim 1, wherein the negative-electrode collector has multiple through holes.

7. The electrochemical device according to claim 1, wherein the positive electrode and the negative electrode are stacked and wound together with the separators in between.

8. The electrochemical device according to claim 7, wherein an electrode on an outermost side of winding is the negative electrode, and the second principal face faces outward, wherein the first uncoated area is provided on the outermost side of winding.

* * * * *